US012516793B2

(12) United States Patent
Lynch et al.

(10) Patent No.: US 12,516,793 B2
(45) Date of Patent: Jan. 6, 2026

(54) HOUSING FOR LIGHT FIXTURE

(71) Applicant: LUMASCAPE PTY LTD, Eight Mile Plains (AU)

(72) Inventors: Glenn Robert Lynch, Mansfield (AU); Gary Neville Taber, Daisy Hill (AU); Aurelien Simon Claude Ray, Thorneside (AU); Jinghao Lin, Sunnybank Hills (AU)

(73) Assignee: LUMASCAPE PTY LTD, Eight Mile Plains (AU)

( * ) Notice: Subject to any disclaimer, the term of this patent is extended or adjusted under 35 U.S.C. 154(b) by 0 days.

(21) Appl. No.: 19/028,812

(22) Filed: Jan. 17, 2025

(65) Prior Publication Data

US 2025/0251112 A1 Aug. 7, 2025

Related U.S. Application Data

(60) Provisional application No. 63/548,572, filed on Feb. 1, 2024.

(51) Int. Cl.

| | |
|---|---|
| ***F21V 15/01*** | (2006.01) |
| ***F21S 8/02*** | (2006.01) |
| ***F21V 19/04*** | (2006.01) |
| ***F21W 131/10*** | (2006.01) |

(52) U.S. Cl.
CPC .............. *F21V 15/01* (2013.01); *F21S 8/022* (2013.01); *F21S 8/024* (2013.01); *F21V 19/04* (2013.01); *F21W 2131/10* (2013.01)

(58) Field of Classification Search
CPC ........... F21S 8/022; F21S 8/024; F21V 15/01; F21V 21/04
See application file for complete search history.

(56) References Cited

U.S. PATENT DOCUMENTS

| | | | | |
|---|---|---|---|---|
| 6,068,384 | A * | 5/2000 | Tyson | F21S 8/022 362/153.1 |
| 2004/0252508 | A1* | 12/2004 | Lin | F21V 31/00 362/267 |
| 2013/0039037 | A1* | 2/2013 | Drury | F21V 21/047 362/101 |
| 2013/0322091 | A1* | 12/2013 | Honeycutt | F21V 17/04 362/319 |
| 2020/0271291 | A1* | 8/2020 | Ward | F21V 33/0076 |

* cited by examiner

*Primary Examiner* — Alexander K Garlen
(74) *Attorney, Agent, or Firm* — KNOBBE, MARTENS, OLSON & BEAR, LLP

(57) ABSTRACT

An in-grade light assembly can include an inner housing assembly, an outer housing, and a collar. The collar is movable between an unlocked configuration and a locked configured so as to prevent rotation and translation of the inner housing assembly relative to the outer housing.

24 Claims, 11 Drawing Sheets

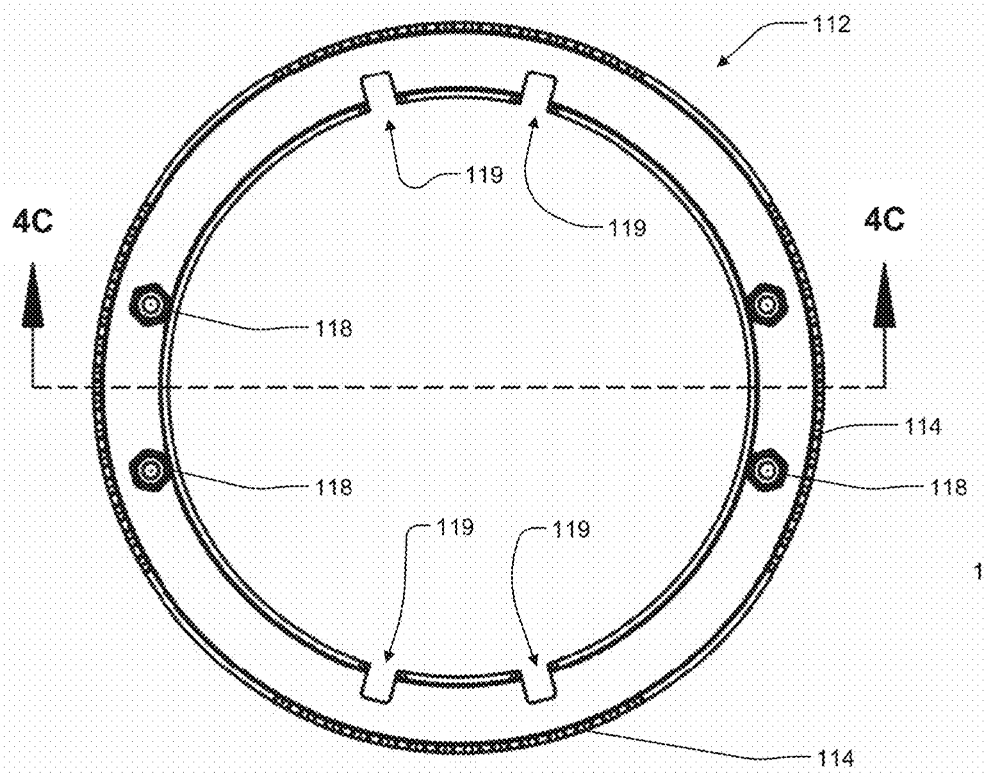
Figure 4A
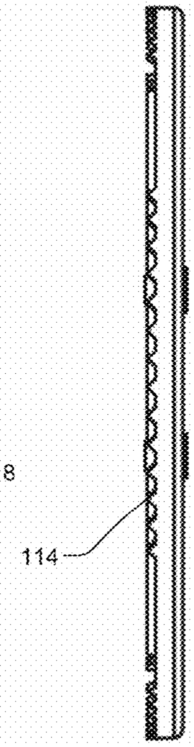
Figure 4B
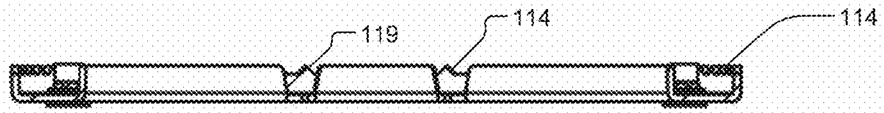
Figure 4C
FIGURES 4A-4C

HOUSING FOR LIGHT FIXTURE

CROSS-REFERENCE TO RELATED APPLICATION

This application claims benefit under 35 U.S.C. 119 (e) to U.S. Provisional Patent App. No. 63/548,572, filed Feb. 1, 2024, the entire disclosure of which is hereby incorporated by reference herein in its entirety. Any and all priority claims identified in the Application Data Sheet, or any corrections thereto, are hereby incorporated by reference under 37 CFR 1.57.

BACKGROUND

Technical Field

The present invention relates to light fixtures, and more particularly, light fixtures designed for outdoor installation.

Description of the Related Art

Outdoor lighting is popular for security, aesthetic, safety, and other reasons. Various types of commercial landscape light fixtures are available to meet the particular needs of residential or commercial properties. These include path, down, deck, tree, spot, spread, and security light fixtures.

SUMMARY

In many installations and circumstances, it is desirable to utilize a light fixture that is reliable and easy to repair. This can be especially true in installation environments subject to rain or other environmental hazards. In some cases, a reliable and easy-to-repair light fixture can include an outer housing configured to receive an inner housing assembly. The inner housing assembly can be constructed to include many or most of the lighting and/or electrical components of the light fixture. In some cases, the inner housing assembly is interchangeable with other inner housing assemblies (e.g., replacement inner housing assemblies having varying lighting/power/operable features). The inner housing assembly can include structure configured to facilitate easy installation and removal of the body from the outer housing.

An aspect is directed to a housing for a light assembly comprising an outer housing having a first end configured to be positioned at or below a ground level or wall surface when installed, a second end opposite the first end, a sleeve portion between the first end and the second end, the sleeve portion having an inner surface, a ledge, and an outer housing axis extending through the first and second ends of the outer housing. The in-grade light assembly further comprises a collar movable in a direction that is parallel to the outer housing axis between a locked configuration and an unlocked configuration, the collar having a slot and a contact surface. The slot is sized and shaped to receive a mating structure of a body of the light assembly at least when the light assembly is placed within the outer housing so as to prevent the light assembly from rotating relative to the collar. The contact surface is configured to contact the ledge when the collar is in the locked configuration so as to prevent both removal and rotation of the body relative to the outer housing. Wherein the collar and the light assembly are rotatable in concert with each other relative to the outer housing when the collar is in the unlocked configuration and the mating structure is received within the slot.

Additional aspects further comprise wherein the collar comprises one or more teeth, and wherein the contact surface is disposed on the one or more teeth.

Additional aspects further comprise wherein an interference fit is created between the one or more teeth and the ledge at least when the collar is in the locked configuration.

Additional aspects further comprise wherein the ledge extends about at least a portion of the inner surface of the sleeve portion.

Additional aspects further comprise wherein the inner surface of the sleeve portion further comprises a member, and wherein the member and the ledge define a channel, and wherein the collar is disposed in the channel.

Additional aspects further comprise wherein the channel comprises a plurality of sections.

Additional aspects further comprise wherein the collar contacts the member when the collar is in the unlocked configuration.

Additional aspects further comprise wherein the collar comprises at least one more slot, and wherein the body comprises at least one more mating structure.

Additional aspects further comprise wherein the collar has an annular shape.

Additional aspects further comprise wherein the direction that the collar moves when the collar is moving from the unlocked configuration to the locked configuration is an upward direction.

Additional aspects further comprise one or more drive screws configured to cause the collar to move from the unlocked configuration to the locked configuration.

Additional aspects further comprise wherein the collar further comprises one or more nuts configured to be engaged by the one or more drive screws at least when the collar is in the locked configuration.

Additional aspects further comprise wherein the collar is configured to move toward and away from the first end of the outer housing in response to user input to the one or more drive screws.

Additional aspects further comprise the light assembly.

Additional aspects further comprise a cover configured to be secured to the body of the light assembly.

Additional aspects further comprise wherein the light assembly is configured to receive a light module, the light module being configured to emit light through the first end of the outer housing when the light assembly is installed within the outer housing.

Additional aspects further comprise a lens assembly connected to the body of the light assembly.

An aspect is directed to an in-grade light assembly comprising an outer housing configured to be positioned at or below a ground level or wall surface when installed, the outer housing comprising a ledge, an inner housing assembly configured to be placed within the outer housing, and a collar disposed in the outer housing and having a contact surface, the collar being configured to rotate about an axis and slide parallel to the axis relative to the outer housing when in an unlocked configuration. The contact surface contacts the ledge when the collar is in a locked configuration so as to prevent both removal and rotation of the inner housing assembly and the collar relative to the outer housing.

Additional aspects further comprise wherein the collar has an annular shape.

Additional aspects further comprise wherein the outer housing comprises a channel, and wherein the collar is disposed in the channel.

Additional aspects further comprise wherein the collar comprises a slot configured to receive a mating structure of the inner housing assembly at least when the collar is in the unlocked configuration.

Additional aspects further comprise wherein the inner housing assembly is prevented from rotating relative to the collar when the mating structure is received within the slot.

Additional aspects further comprise wherein the collar comprises a nut, the nut being configured to receive a drive screw at least when the collar is in the locked configuration.

Additional aspects further comprise wherein the drive screw is tight to the nut when the collar is in the locked configuration.

Additional aspects further comprise a support configured to provide additional stiffness, rigidity, and/or strength to the in-grade light assembly.

Additional aspects further comprise a ring configured to provide additional stiffness, rigidity, and/or strength to the in-grade light assembly.

BRIEF DESCRIPTION OF THE DRAWINGS

The present disclosure is described with reference to the accompanying drawings, in which like reference characters reference like elements, and wherein:

FIGS. 4A-C are views of the collar from FIG. 3.

DETAILED DESCRIPTION

Figure 1:
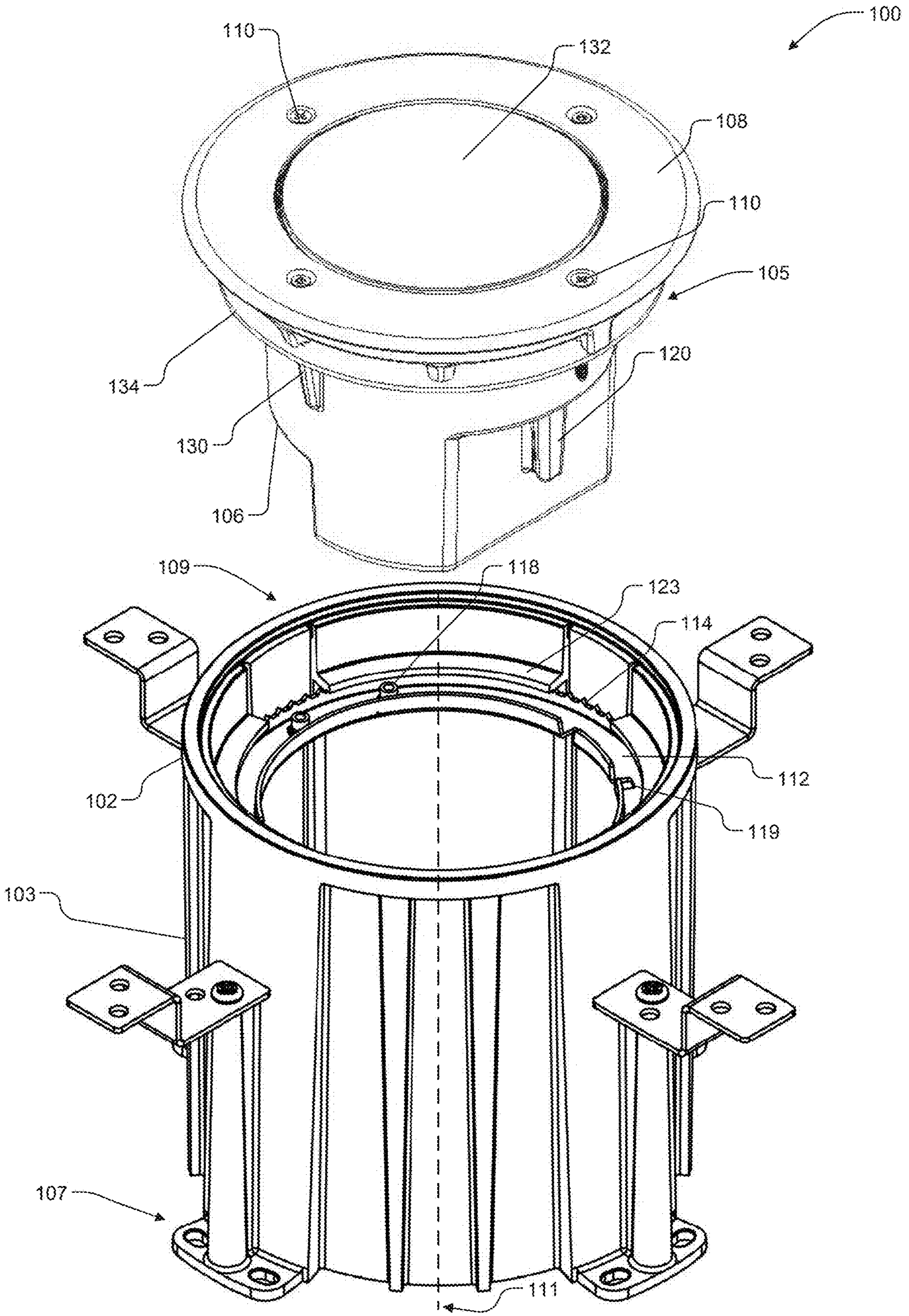
FIG. 1 is a perspective side view of an inner housing assembly of an in-grade light before being placed and secured into a housing.

Outdoor light fixtures are often exposed to environmental hazards such as moisture, temperature variants, dirt, wind, sunlight, and other hazards. Additionally, like many electrical devices, light fixtures often require routine and non-routine maintenance for a variety of reasons. For example, light engines, light bulbs, circuits, wiring, and other components of light fixtures may have limited service lives and may require replacement and/or repair. In some cases, one or more components of the light fixture may be consumable, while all or most of the remaining components are designed for long-term installation and use.

Repair and replacement of components in a light fixture, especially an outdoor light fixture, can be costly, as the maintenance services can require specially-trained technicians and may require complete or substantially complete replacement of the entire fixture. As such, it is desirable that the repair of light fixtures be simplified to both reduce the cost of repair and to expedite the process of repairing fixtures.

In-ground lights are sometimes referred to as "in-grade lights". In-Grade lights can provide desired lighting for applications such as landscaping, structural lighting, pathway lighting, or other applications where upward-directed light is desired. In-Grade lights can also be used in applications to provide downward-directed or sideways-directed light. In-Grade lights can be installed in many environments including, but not limited to, landscaping beds, concrete (e.g., walkways or driveways), and/or turf. For example, in certain embodiments of the in-grade light disclosed herein, the in-grade light can be secured flush with a roadway while also preventing the in-grade light from rotating when a vehicle tire is turned while in contact with the in-grade light.

In-Grade lights can have a low profile (e.g., extend very little or not at all in an upward direction from the ground). In-Grade lights can be flush with or (entirely or partially) recessed from an adjacent surface. In some applications, activities such as lawn mowing, walking, driving, pressure-washing, and/or other activities can be performed on and/or near in-grade lights without negatively impacting the integrity or performance of the light.

Embodiments of in-grade light fixtures 100 discussed herein provide structures which simplify installation and repair by, for example, employing an adjustable collar 112 within an outer housing 102. For example, the in-grade light fixture 100 can include an inner housing assembly 105 comprising one or more light components as a light assembly. The inner housing 105 may be placed in the outer housing 102 which is fixedly installed almost entirely below ground level. The outer housing 102 may be pre-installed into a substrate flooring, wood or metal supports, or ground material prior to being more permanently set by surrounding the outer housing 102 with soil, sand, gravel, concrete, cement, pavers, or flooring material and the like. The outer housing 102 may include one or more features for retaining the inner housing 105 therein and rotationally adjusting the direction of the illumination.

Figure 2:
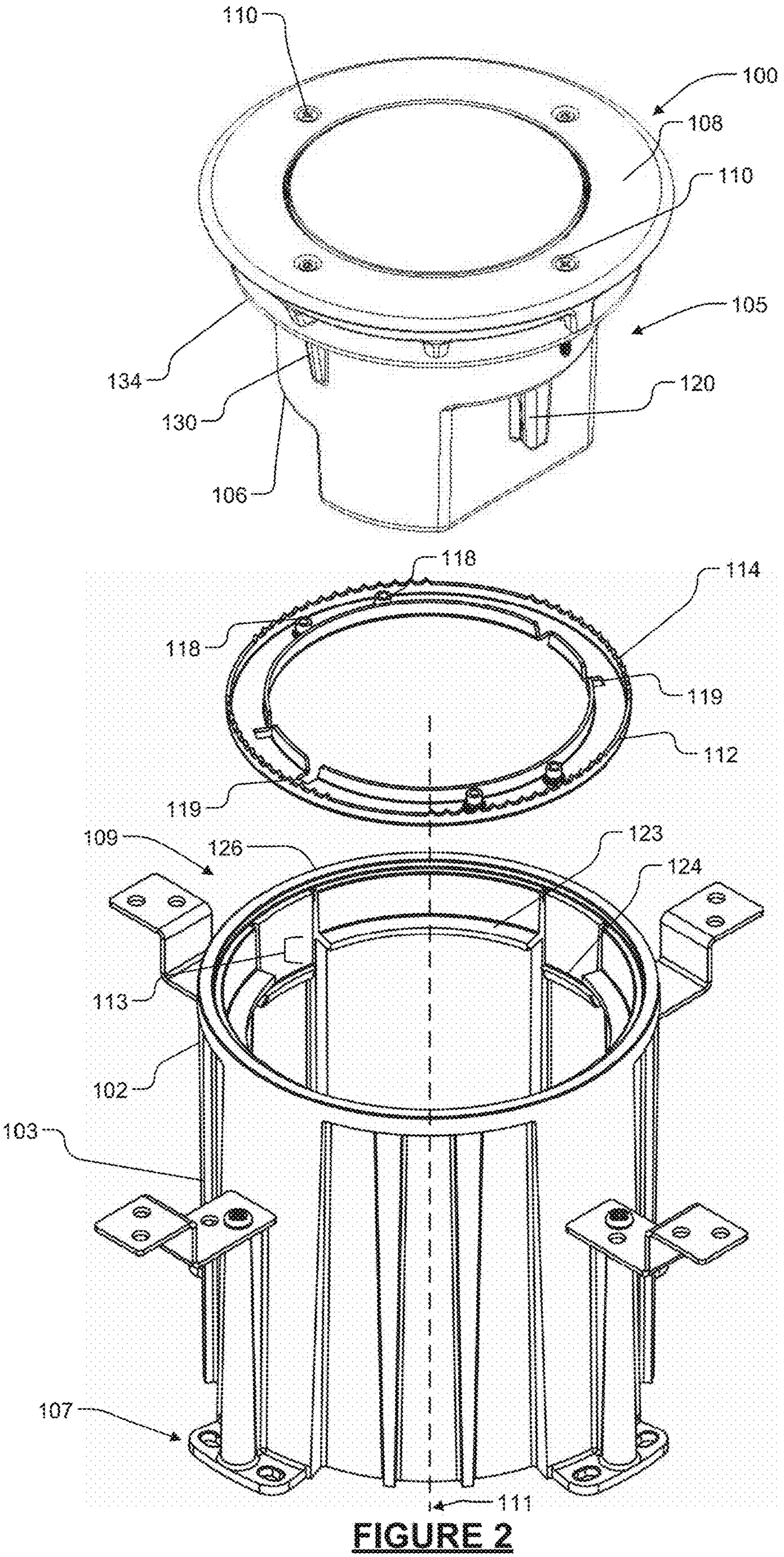
FIG. 2 is a perspective side view similar to FIG. 1 except a collar which is positioned to engage with both the housing and the inner housing assembly is shown removed from the housing.

FIG. 1 is a perspective side view of an inner housing assembly 105 of an in-grade light 100 before being placed and secured into a housing 102. The light components which are part of the inner housing assembly 105 are installed within the housing 102. FIG. 2 is a perspective side view similar to FIG. 1 except a collar 112 which is positioned to engage with both the housing 102 and the inner housing assembly 105 is shown removed from the housing 102. In certain embodiments, the collar 112 is rotationally engaged with an inside surface of the housing 102 so as to allow the collar 112 to freely rotate or spin around an outer housing axis 111 of the housing 102 when not in a locked configuration. In certain embodiments, the collar 112 is further configured to slide parallel to the outer housing axis 111 between the locked configuration and an unlocked configuration.

In certain embodiments, the housing 102 comprises the collar 112. In certain embodiments, the collar 112 is secured within a channel 113 of the housing 102 during manufacturing. In certain embodiments, the collar 112 is a separate component that is installed into the housing 102 during installation of the in-grade light 100. In certain embodiments, the inside surface of the housing 102 defines the channel 113 sized and shaped to receive the collar 112. In certain embodiments, the channel 113 is formed between a ledge 123 and a member 124 of the housing 102. The ledge 123 and/or the member 124 need not be continuous around the inside surface of the housing 102 to form the channel 113. For example, in the illustrated embodiment, each of the ledge 123 and the member 124 comprise four portions spaced apart about the inside circumference of the housing 102.

In certain embodiments, a height of the channel 113 is greater than a height of the collar 112 so as to allow the collar 112 to slide slightly up and down within the channel 113 between the locked configuration and the unlocked configuration. For example, in certain embodiments, the collar 112 slides in the up direction within the channel 113 when moving from the unlocked configuration to the locked configuration. When in the locked configuration, at least a portion of the collar 112 is engaged with the ledge 123 to prevent the collar 112 (and the inner housing assembly 105 if installed as explained below) from spinning relative to the ledge 123. Similarly, in certain embodiments, the collar 112 slides in the down direction within the channel 113 when moving from the locked configuration to the unlocked configuration. When in the unlocked configuration, the collar 112 is disengaged from the ledge 123 allowing the collar 112 (and the inner housing assembly 105 if installed as explained below) to spin relative to the ledge 123.

Figure 3:
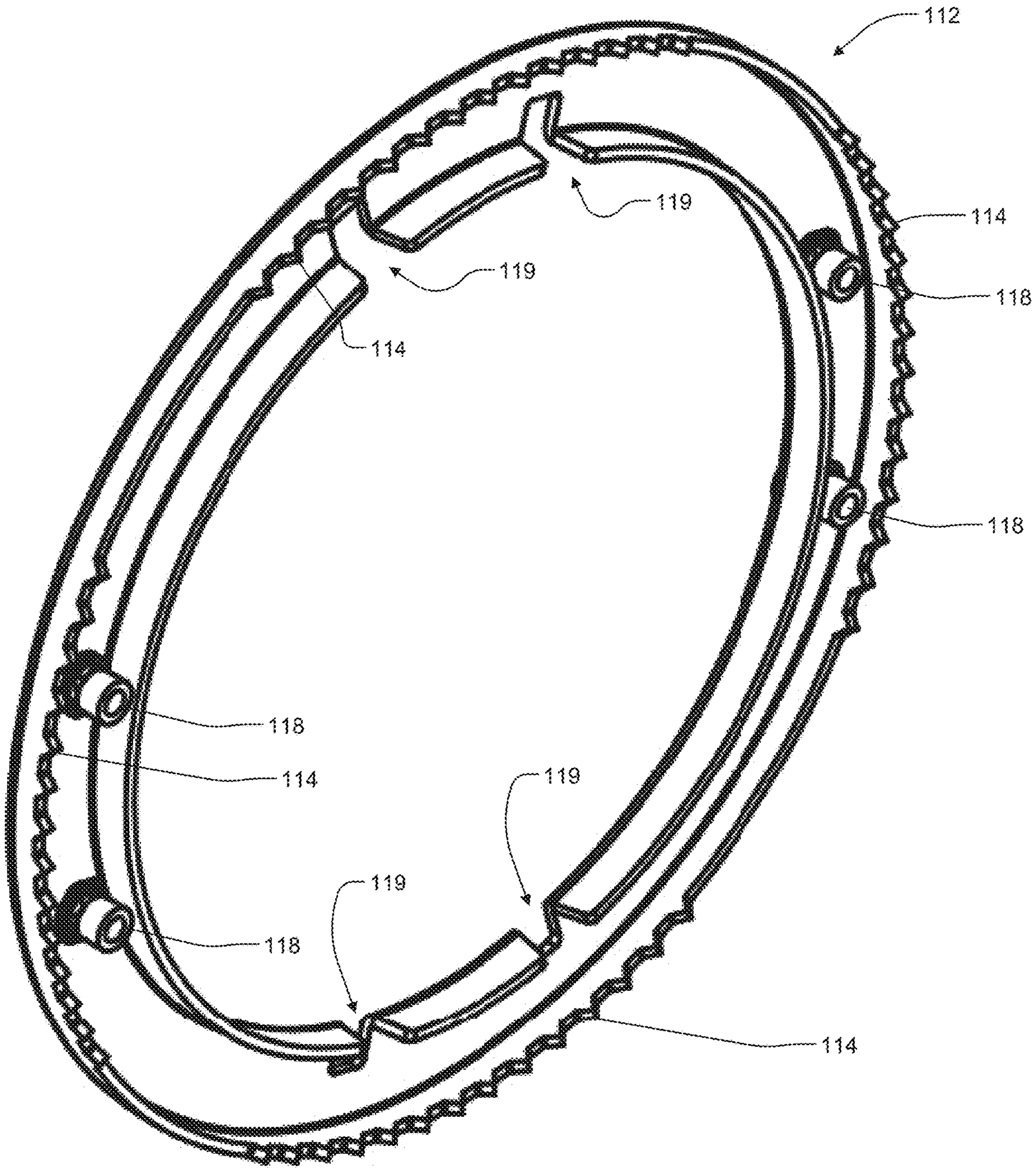
FIG. 3 is a perspective view of the collar from FIG. 2.

FIG. 3 is a perspective view of the collar 112 from FIG. 2. FIGS. 4A-C are views of the collar 112 from FIG. 3. The collar 112 can have an annular shape and comprise any material (e.g., plastics, ceramics, metals, etc.). For example, in certain embodiments, the collar 112 comprises steel or any other metal.

In certain embodiments, the collar 112 comprises one or more teeth 114 facing towards the ledge 123. In certain embodiments, the one or more teeth 114 comprises metal so as to firmly bite into the ledge 123. When in the locked configuration, the one or more teeth 114 lock to the ledge 123 so as to prevent relative rotation between the collar 112 and the housing 102. Of course, the collar 112 need not comprise the one or more teeth 114 and still fall within the scope of this disclosure.

In certain embodiments, rotation of one or more drive screws or fasteners 116 causes the collar 112 to slide relative to the body 102 between the locked and unlocked configurations. Depending on whether the one or more drive screws or fasteners 116 are rotated in a clockwise or counterclockwise direction, the collar 112 moves in an upward or downward direction relative to the body 102. By rotating the one or more drive screws or fasteners 116, the user is able to secure the inner housing assembly 105 in the housing 102 by creating a desirable amount of interference fit between the one or more teeth 114 of the collar 112 and the ledge 123 of the housing 102. For example, the interference fit can lock the inner housing assembly 105 in the housing 102. In certain embodiments, the one or more teeth 114 of the collar 112 contacts the ledge 123. In certain embodiments, a different portion of the collar 112 contacts the ledge 123. In certain embodiments, a different portion of the housing 102 contacts the collar 112.

The inner housing assembly 105 can include a plurality of collars 112 and/or one or more teeth 114 on each collar 112. For example, in certain embodiments, the housing 102 comprises two collars 112. Thus, the housing 102 is not limited to having a single collar 112 and can instead have any number of collars 112 (e.g., 2, 3, 4, 5, etc.) without deviating from the scope of this disclosure.

In certain embodiments, the collar 112 comprises one or more receptacles or nuts 118. In certain embodiments, the one or more receptacles or nuts 118 are configured to engage with the one or more drive screws or fasteners 116. In certain embodiments, the one or more receptacles or nuts 118 are coupled to the collar 112 and configured to move along the one or more drive screws or fasteners 116. For example, rotation of the one or more drive screws or fasteners 116 causes the one or more receptacles or nuts 118 and the collar 112 to move in an upward or downward direction depending on the direction the one or more drive screws or fasteners 116 is rotated. The relative rotation of the engaged threads on the one or more receptacles or nuts 118 and the one or more drive screws or fasteners 116 causes the one or more receptacles or nuts 118 to move along the length of the one or more drive screws or fasteners 116. In this way, in certain embodiments, a tool engagement end 110 of the one or more drive screws or fasteners 116 can remain flush with a top of the light fixture 100 regardless of the position of the one or more receptacles or nuts 118 along the one or more drive screws or fasteners 116.

In certain embodiments, the collar 112 comprises one or more slots/apertures 119 configured to receive one or more mating structures 130 of the inner housing assembly 105. In certain embodiments, the collar 112 comprises four slots/apertures 119. In certain embodiments, the one or more slots/apertures 119 are disposed about an inner circumference of the collar 112 while the one or more mating structures 130 are disposed about an outer circumference of the inner housing assembly 105. For example, in certain embodiments, two of the one or more mating structures 130 of the inner housing assembly 105 slide into two of the one or more slots/apertures 119 of the collar 112 as the inner housing member 105 is lowered into the housing 102 to then prevent rotation of the inner housing assembly 105 relative to the collar 112. In certain embodiments, the inner housing assembly 105 along with the collar 112 rotate in concert with each other when in the unlocked configuration. Thus, only relative rotation between the inner housing assembly 105 and the collar 112 is prevented. The inner housing assembly 105 is not prevented from rotating relative to the housing 102. Such an arrangement may be advantageous, since a user can still rotate the inner housing assembly 105 within the housing 102 to clock or align the inner housing assembly 105 of the in-grade light 100. However, once the one or more teeth 114 of the collar 112 engage with the ledge 123 of the housing 102 by turning the one or more drive screws or fasteners 116, the inner housing assembly 105 is prevented from rotating relative to the housing 102. The user can disengage the one or more teeth 114 from the ledge 123 by loosening the one or more drive screws or fasteners 116, adjust the clocking, and then retighten the one or more drive screws or fasteners 116.

For example, in certain embodiments, as the one or more receptacles or nuts 118 and the collar 112 move in an upward direction, the one or more teeth 114 of the collar 112 move towards, engage, and slightly deflect the ledge 123. This deflection can further enhance the degree of interference between the collar 112 and the housing 102 which can inhibit or prevent movement of the inner housing assembly 105 within the housing 102. In some embodiments, the ledge 123 can include one or more surface features (e.g., grooves, protrusions, etc.) configured to increase a degree of the interference between the collar 112 and the ledge 123 of the housing 102.

In the illustrated embodiment, a cross-section of at least a portion of the collar 112 has a U shape. Of course, the of the collar 112 is not limited to the illustrated shape and can have any other shape.

The collar 112 can be manufactured out of one or more materials (e.g., plastic, rubber, metal, etc.) that provide an adequate level of friction (e.g., prevent relative movement once installed) when in contact with the housing 102. For example, the collar 112 can be made from metal or another high hardness material if the contact between the metal and the material of the housing 102 provides an adequate level of friction to prevent relative movement (e.g., metal and a very rough concrete or rock material). The amount of friction can be further adjusted by varying the size of the contact area between the one or more teeth 114 of the collar 112 and the ledge 123 of the housing 102.

In certain embodiments, the collar 112 is made from more than one material. For example, in certain embodiments, a core of the collar 112 is manufactured out of metal and the regions (e.g., teeth 114) of the collar 112 which contact the housing 102 are manufactured from silicone or other high friction material to enhance their grip. In certain embodiments, the one or more teeth 114 is over molded with the core of the collar 112. In certain other embodiments, the one or more teeth 114 are assembled to the collar 112.

Figure 5:
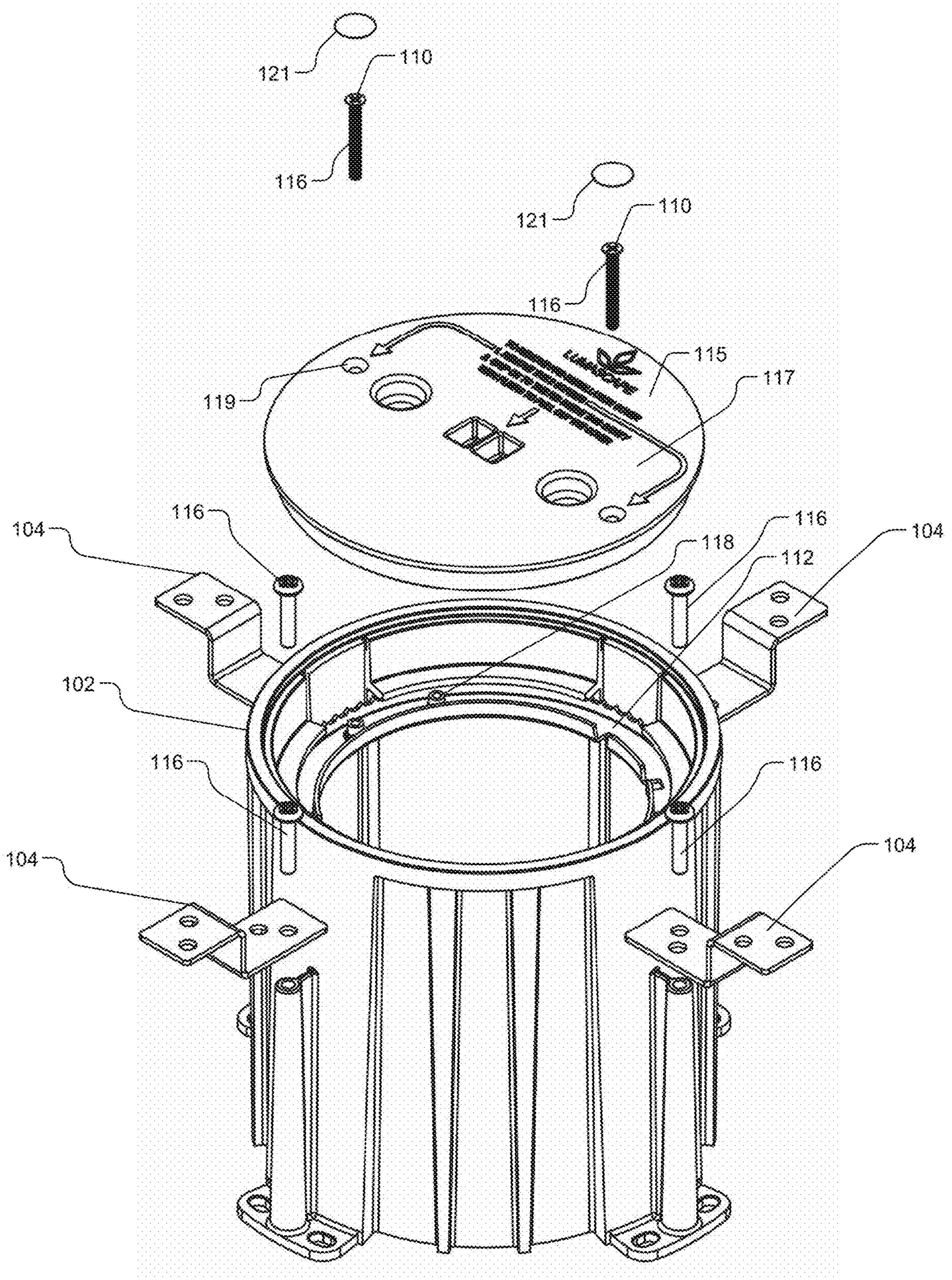
FIG. 5 is a perspective view of the housing of the in-grade light, wherein an installation cap is aligned above an open end of the housing prior to installation.

FIG. 5 is a perspective view of the housing of the in-grade light 100, wherein an installation cap 115 is connected to the open end of the housing 102. As illustrated, the installation structures can include the installation cap 115. The installation cap 115 can include a cover portion 117 having a generally planar shape. In some embodiments, the cover portion 117 is sized to cover all or substantially all of the upper end and/or connection of the housing 102 to prevent incursion of soil, gravel, concrete, cement, and the like during installation of the housing 102. The cover portion 117 can include one or more slots/apertures 119 configured to align with the one or more receptacles or nuts 118 of the collar 112. The one or more drive screws or fasteners 116 can be inserted through the one or more slots/apertures 119 into the one or more receptacles or nuts 118 of the collar 112 to connect the installation cap 115 to the housing 102. In some embodiments, other connection methods and structures (e.g., detents, friction fittings, threading, etc.) are used in addition to or instead of the one or more drive screws or fasteners 116.

In certain embodiments, the housing 102 comprising one or more flanges 104 configured for securing the outer housing 102 to the environment. In certain embodiments, one or more drive screws or fasteners 116 secure the one or more flanges 104 to the environment. In certain embodiments, one or more O-rings 121 are included.

Figure 6:
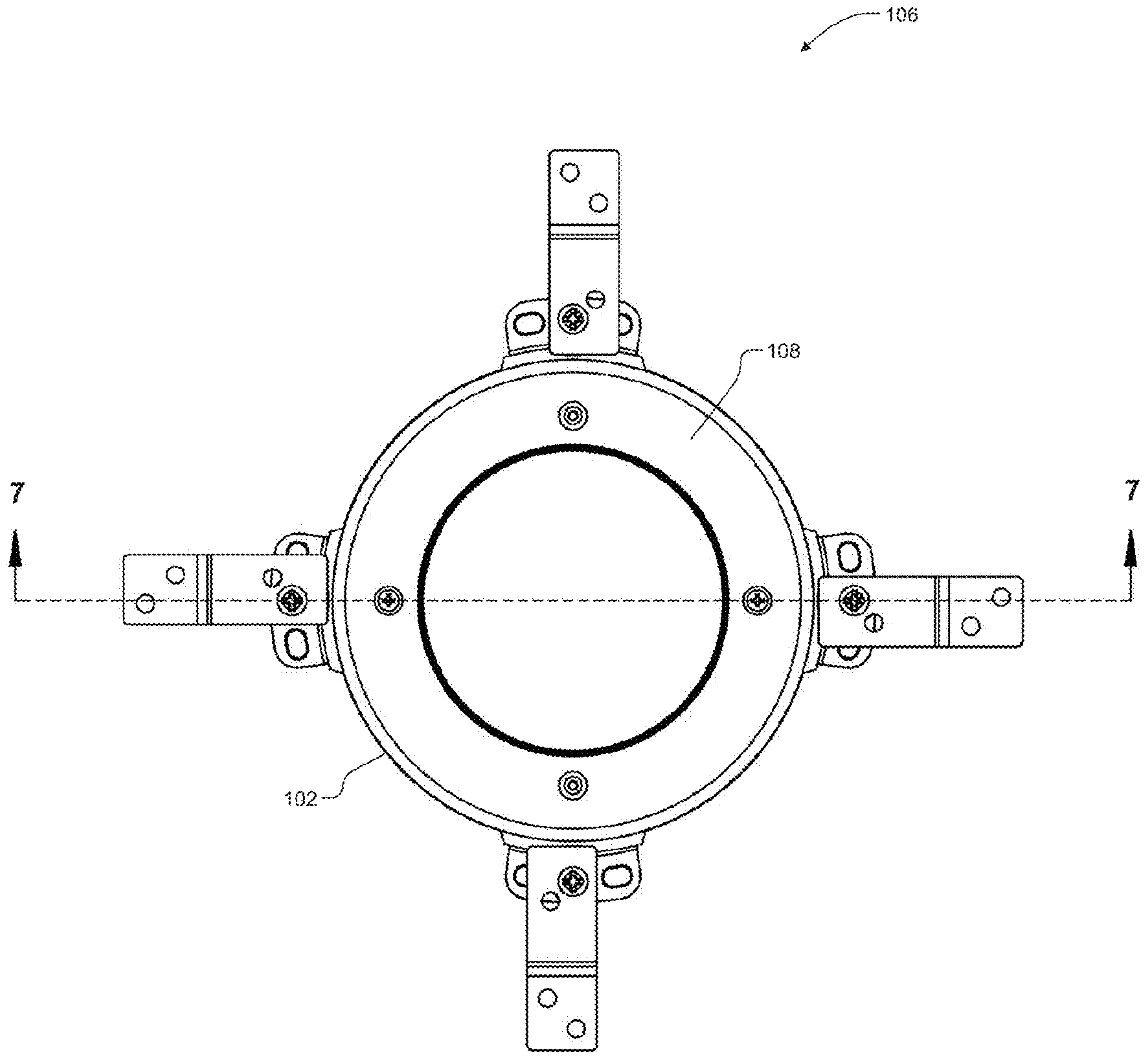
FIG. 6 is a top view of the in-grade light from FIG. 1 after the inner housing assembly has been placed in the housing in a free spin configuration which allows the inner housing assembly and the collar to rotate relative to the housing.
Figure 7:
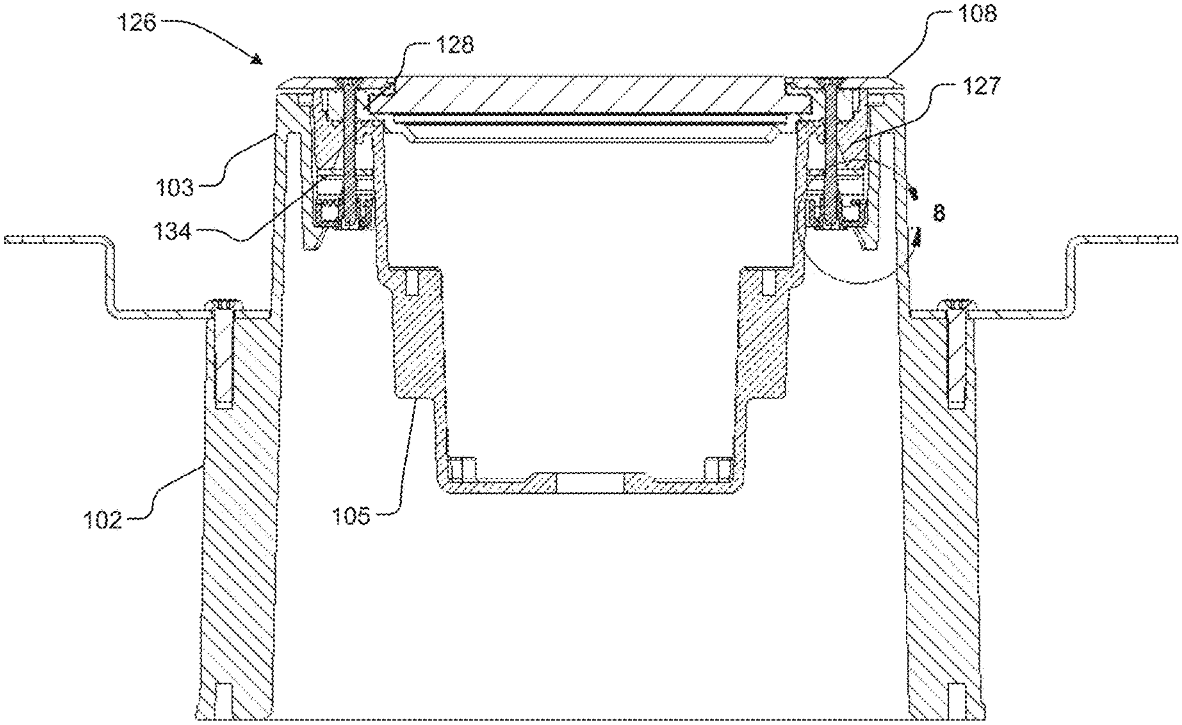
FIG. 7 is a cross-section view taken along lines 7-7 of FIG. 6 showing the inner housing assembly and the collar in the free spin configuration.

FIG. 6 is a top view of the in-grade light 100 from FIG. 1 after the inner housing assembly 105 has been placed in the housing 102 in a free spin configuration which allows the inner housing assembly 105 and the collar 112 to rotate relative to the housing 102. FIG. 7 is a cross-section view taken along lines 7-7 of FIG. 6 showing the inner housing assembly 105 and the collar 112 in the free spin configuration.

Because in-grade lights 100 are often installed at least partially underground, they are especially susceptible to moisture, dirt, and other environmental hazards. In some cases, the position of the in-grade light 100 can make replacement and/or repair of parts within the light difficult due to the high risk of moisture ingress into the light and the difficulty of removing moisture from the light. Additionally, it can be difficult to secure the in-grade light 100 within the housing 102 while achieving a desired rotational clocking of a beam of light emitted by the inner housing assembly 105.

An example of such an in-grade light 100 is illustrated in the figures. The in-grade light 100 can include one or more housings in which electrical and mechanical components are housed. For example, the in-grade light 100 can include the housing 102. The inner housing assembly 105 may be positioned at least partially within the housing 102 when the in-grade light 100 is assembled.

The inner housing assembly 105 can include a body 106 and a light module or cartridge disposed within the body 106. In some embodiments, the body 106 can be configured to releasably connect to the housing 102 via the collar 112. For example, in the illustrated embodiment, adjustment of the collar 112 in an upward or downward direction can fix and/or lock a position of the inner housing assembly 105 within the housing 102. Further, in certain embodiments, the clocking of the collar 112, the body 106, and the emitted light beam can be adjusted by simply rotating the body 106 relative to the housing 102 when the collar 112 is in the unlocked configuration.

In certain embodiments, the light module or cartridge can be tilted relative to the body 106. The in-grade light 100 can include a cover 108 configured to couple with one or both of the housing 102 and the inner housing assembly 105.

The body 106 can be manufactured out of one or more materials (e.g., plastic, rubber, metal, etc.). For example, in certain embodiments, the body 106 can be made from brass. In other embodiments, the body 106 is made from a composite plastic.

In certain embodiments, the inner housing assembly 105 comprises one or more structures in the form of, for example, a ring 134 and/or a support 120. The one or more structures can provide additional reinforcement, stiffness, rigidity, and/or strength in order for the inner housing assembly 105 to resist forces applied to the inner housing assembly 105 during, for example, installation/adjustment of the body 106 within the housing 102. For example, the ring 134 and/or the support 120 can be positioned relative to portions of the body 106 so as to increase the stiffness, rigidity, and/or strength at those locations.

In certain embodiments, the ring 134 and/or the support 120 are assembled to or can form a unitary structure with the body 106. For example, in the illustrated embodiment, the ring 134 is disposed around an outer circumference of the body 106. As is illustrated, the support 120 is disposed generally vertically on a outer surface of the body 105. In this way, the ring 134 and/or the support 120 can provide additional stiffness to the body 106 so as to resist undesirable deflection of the body 106.

In the illustrated embodiments, the ring 134 extends around the entire circumference of the body 106. Of course the ring 134 need not extend around the entirety of the body 106 to provide additional support to the body 106. In certain embodiments, the ring 134 is disposed so as to contact multiple surfaces of the body 106 (e.g., vertical and horizontal surfaces).

The ring 134 and/or the support 120 each can comprise the same or a different material than the body 106. For example, in certain embodiments, the support 120 comprises the same material as the body 106 and is formed with the body 106 as a unitary structure. In certain embodiments, the ring 134 comprises the same material as the body 106. In other embodiments, the ring 134 comprises a different material and can be assembled to or co-molded with the body 106. For example, in certain embodiments, the ring 134 comprises a metal while the body 106 comprises a plastic.

As will be discussed in more detail below, the in-grade light 100 can include one or more mechanisms or structures configured to facilitate fixing and/or locking the position of the inner housing assembly 105 within the outer housing 102.

The housing 102 of the in-grade light 100 can include a sleeve portion 103. The sleeve portion 103 can have a first end (e.g., lower end) 107 and a second end (e.g., upper end) 109. The second end 109 can be open. In some embodiments, the first end 107 is closed. The housing 102 (e.g., the sleeve portion 103) is hollow or at least partially hollow. The housing 102 can have the outer housing axis 111 extending through one or both of the first and second ends 107, 109 of the sleeve portion 103.

As illustrated in FIG. 7, the sleeve portion 103 can be connected to a connection portion 126. The connection portion 126 can be, for example, positioned at the second end 109 of the sleeve portion 103. The connection portion 126 can be configured to connect and/or support the inner housing assembly 105 and/or the cover 108. In certain embodiments, the connection portion 126 can comprise a gasket or seal 128.

The housing 102 can include one or more electrical ports. The one or more electrical ports can be configured to facilitate electrical connection between the interior of the housing 102 and the exterior of the housing 102. The one or more electrical ports can be positioned at or near the first end 107 of the sleeve portion 103.

The sleeve portion 103 can have a cylindrical or generally cylindrical shape. In some embodiments, one or more segments of the sleeve portion 103 have a different shape from one or more other segments of the sleeve portion 103. For example, one or more segments of the sleeve portion 103 can have a rectangular cross-sectional shape (e.g., as measured perpendicular to the outer housing axis 111), a triangular cross-sectional shape, an oval cross-section, and/or some other polygonal or curved cross-sectional shape.

The housing 102 can include a plurality of electrical ports. For example, the housing 102 can include two electrical ports. Three or more electrical ports are also contemplated. One or more of the electrical ports can be a stamped portion of the sleeve portion 103. The stamped portion can be punched out if or when the user (e.g., installation technician) decides to use the electrical port in question. Unused electrical ports can be left un-punched and impervious to fluid ingress or egress. The electrical ports may be molded into the housing 102 for example when the housing 102 is plastic.

The electrical ports can include threaded portions configured to engage with electrical fittings. In some embodiments, the electrical ports are configured to engage with external electrical fittings in a fluid and/or liquid-tight manner.

The inner housing assembly 105 can be configured to couple and decouple with the housing 102. In some embodiments, the inner housing assembly 105 is configured to pass at least partially through the second end 109 of the housing 102 during coupling with and decoupling from the housing 102.

The inner housing assembly 105 can be constructed such that, when assembled, the inner housing assembly 105 hermetically (e.g., in an air-tight, or water-tight manner) seals an interior of the inner housing assembly 105 from an exterior of the inner housing assembly 105.

Figure 8:
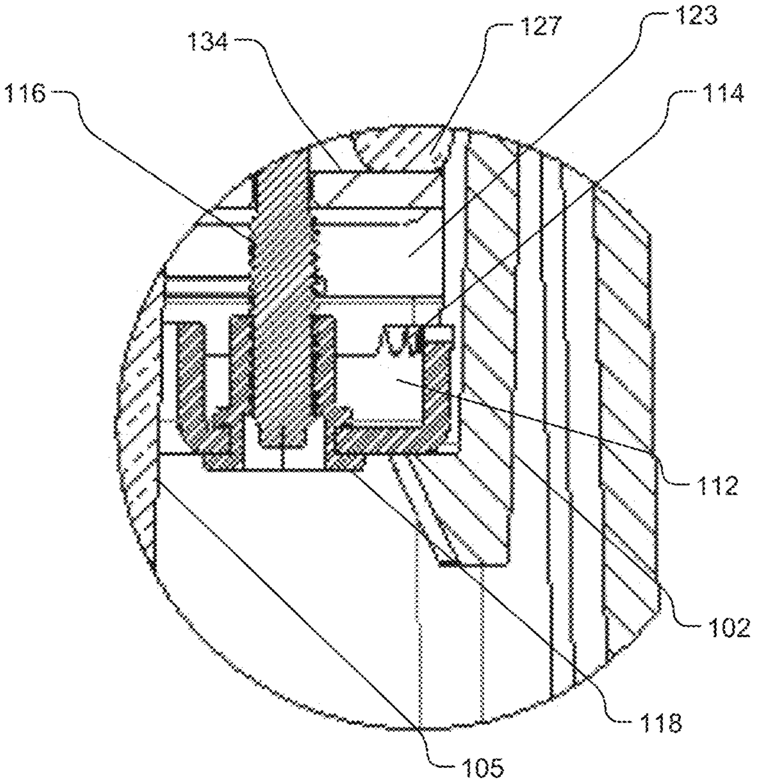
FIG. 8 is an enlarged view of a portion of FIG. 7 showing a fastener loosely engaged between the inner housing assembly and a nut of the collar allowing the inner housing assembly and the collar to spin relative to the housing.

FIG. 8 is an enlarged view of a portion of FIG. 7 showing one or more drive screws or fasteners 116 loosely engaged between the inner housing assembly 105 and the one or more receptacles or nuts 118 of the collar 112 allowing the inner housing assembly 105 and the collar 112 to spin relative to the housing 102. As illustrated in FIG. 8, the one or more teeth 114 of the collar 112 is not engaged with the ledge 123 (e.g., a gap exists) which allows the user to adjust the clocking of the emitted beam of light by simply rotating the inner housing assembly 105 while the inner housing assembly 105 rests within the housing 102.

Figure 9:
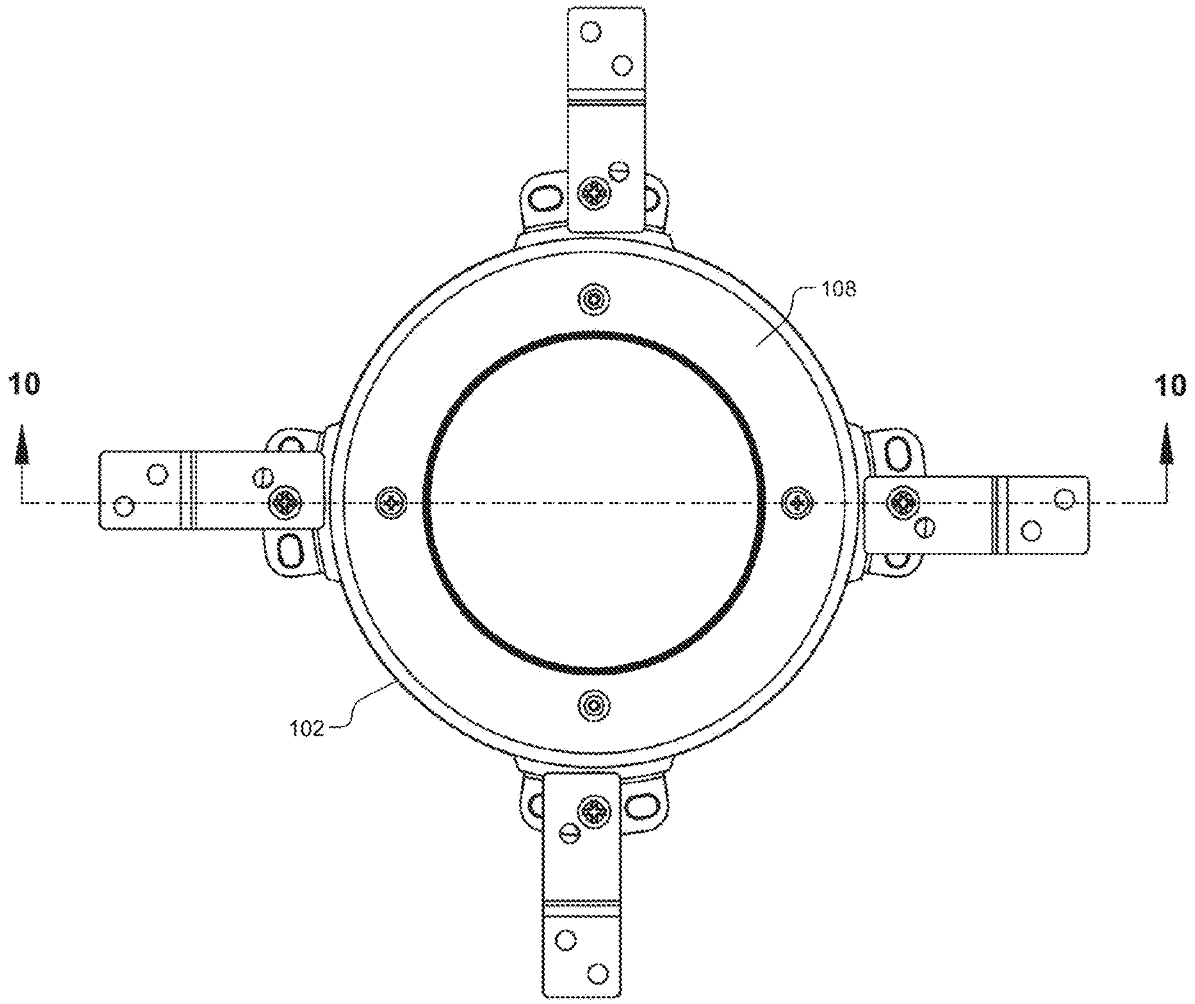
FIG. 9 is a top view similar to FIG. 6 except the inner housing assembly has been secured to the housing in a locked configuration so as to prevent the inner housing assembly and the collar from spinning relative to the housing.
Figure 10:
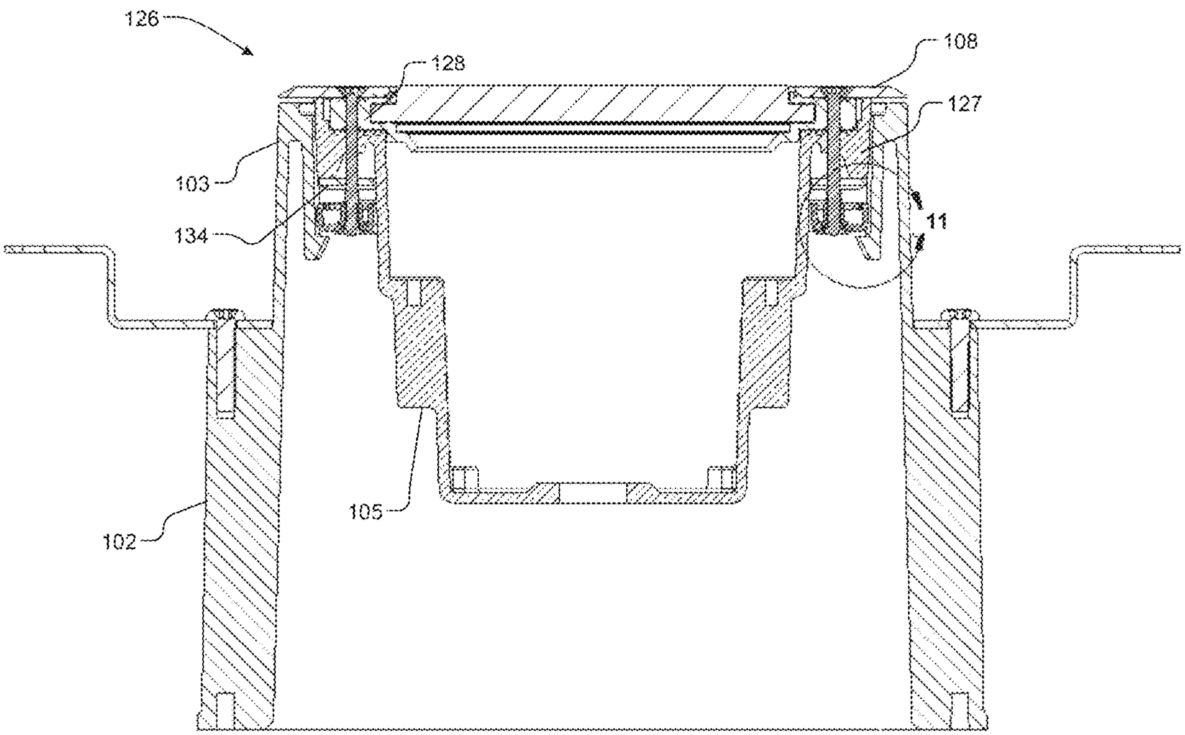
FIG. 10 is a cross-section view taken along lines 10-10 of FIG. 9 showing the inner housing assembly and the collar in the locked configuration.
Figure 11:
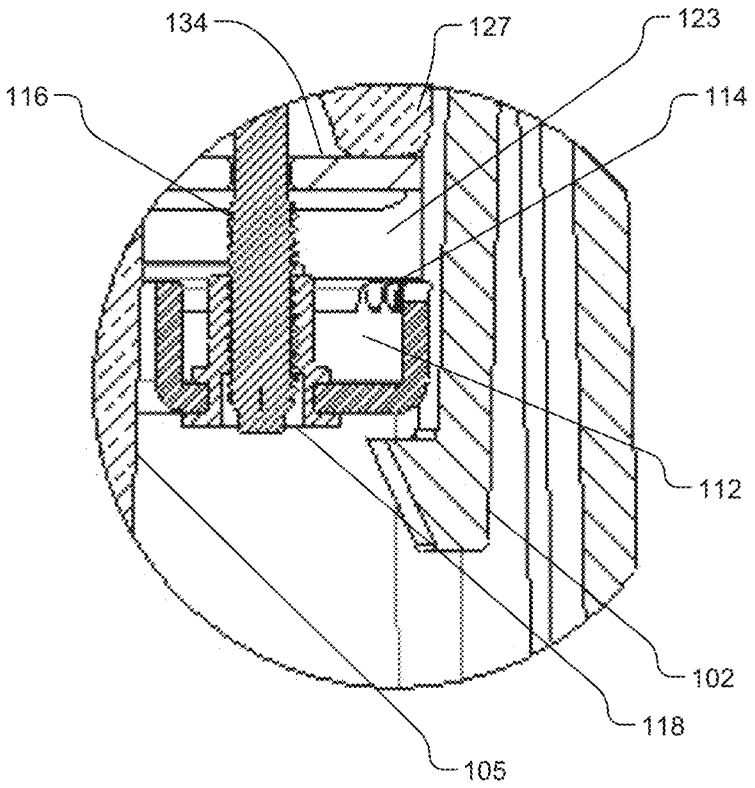
FIG. 11 is an enlarged view of a portion of FIG. 10 showing the fastener tightly engaged between the inner housing assembly and the nut of the collar preventing the collar and the inner housing assembly from spinning relative to the housing.

FIG. 9 is a top view similar to FIG. 6 except the inner housing assembly 105 has been secured to the housing 102 in a locked configuration so as to prevent the inner housing assembly 105 and the collar 112 from spinning relative to the housing 102. FIG. 10 is a cross-section view taken along lines 10-10 of FIG. 9 showing the inner housing assembly 105 and the collar 112 in the locked configuration as most clearly shown in FIG. 1. The inner housing assembly 105 (e.g., body 106) can include the one or more mating structures 130. The mating structure 130 can be, for example, a shoulder, flange, indentation, protrusion, aperture, and/or some other structure configured to facilitate mating between the inner housing assembly 105 and the collar 112. In the illustrated embodiment, the mating structure 130 is a vertical ridge configured to fit within the one or more slots/apertures 119 of the collar 112 (see FIGS. 4A-4C).

In certain embodiments, the one or more slots/apertures 119 are sized and shaped to receive the one or more mating structures 130 of the inner housing assembly 105. In certain embodiments, the one or more mating structures 130 of the inner housing assembly 105 slide into the one or more slots/apertures 119 of the collar 112 as the inner housing member 105 is lowered into the housing 102 to prevent rotation of the inner housing assembly 105 relative to the collar 112. In certain embodiments, the inner housing assembly 105 along with the collar 112 rotate in concert with each other when in the unlocked configuration. Thus, only relative rotation between the inner housing assembly 105 and the collar 112 is prevented. The inner housing assembly 105 is not prevented from rotating relative to the housing 102.

Once the one or more teeth 114 of the collar 112 engage with the ledge 123 of the housing 102 by turning the one or more drive screws or fasteners 116, the inner housing assembly 105 is prevented from rotating relative to the housing 102. The user can disengage the one or more teeth 114 from the ledge 123 by loosening the one or more drive screws or fasteners 116, adjust the clocking, and then retighten the one or more drive screws or fasteners 116.

Referring to FIG. 7, the inner housing assembly 105 can comprise a flange 127, a gasket 128, and/or other structure configured to facilitate engagement between the housing 102 and the inner housing assembly 105. For example, the flange 127 and the gasket 128 can be held (e.g., compresses, wedged, and/or secured) between the head of the one or more drive screws or fasteners 116 and the one or more receptacles or nuts 118 when the one or more receptacles or nuts 118 and the collar 112 are moved in the upward direction to the locked configuration. In some embodiments, one or more intermediate structures such as the cover 108 can be positioned between the head of the one or more drive screws or fasteners 116 and the one or more receptacles or nuts 118 to hold the flange 127. In this way, rotation of the one or more drive screws or fasteners 116 can cause the one or more receptacles or nuts 118 to tighten the flange 127 while also causing the one or more teeth 114 of the collar 112 to bite into the ledge 123 of the housing 102 securing the in-grade light 100. In certain embodiments, the collar 112 is snug against the ledge 123 to also secure the cover 108.

The inner housing assembly 105 can include the body 106. The body 106 is hollow or at least partially hollow and is configured to receive the light module or cartridge. The light module or cartridge can be configured to removably connect to the body 106. The light module or cartridge can include numerous structural features and components configured to house, maintain, or otherwise integrate with one or more electrical/lighting features and components. The light module or cartridge can be configured to facilitate removal, repair, installation, and/or other customization of the lighting features connected to the light module or cartridge.

The electrical/lighting components can include a light unit assembly. The light unit assembly can be configured to generate light and direct that light with desired lighting characteristics (e.g., shape, intensity, direction, color, and/or other characteristics) from the light module or cartridge. In some embodiments, the light module or cartridge includes one or more electrical connections (e.g., plugs) configured to electronically connect with complementary electronic features of the light 100.

The light unit assembly can include a light engine configured to generate light. In some embodiments, the light unit assembly includes a beam reflector and/or a beam director, each of which can be configured to alter the shape and/or intensity of the light generated by the light engine. The light engine can be or include a light emitting diode (LED) or an array of multiple LED's. In some embodiments, the light engine is a light bulb (e.g., an incandescent, fluorescent, halogen, or other bulb type). In some embodiments, the light engine includes one or more circuit boards and/or other electrical components. The light engine can be electronically connected to one or more sources of power and/or to one or more control units. For example, the light engine can include a plug or other electrical connector configured to mate with the driver and/or with some other component of the light module or cartridge. The light unit assembly can include one or more optical components. The optical component(s) can be, for example, one or more of a diffuser, a color filter, secondary lens, and/or some other optical component.

In some embodiments, the light module or cartridge can be tilted or otherwise non-parallel to the body 106. Angular offset between the light module or cartridge and the body 106 can permit direction of the light from the light module or cartridge in a direction tilted from the outer housing axis 111.

One or more of the structural features of the collar 112 can be configured to releasably mate with one or more features of the housing 102 to facilitate quick and easy installation and removal of the inner housing assembly 105 to and from the housing 102. In certain embodiments, the inner housing assembly 105 and the collar 112 are configured to initially engage with the housing 102 so as to allow the inner housing assembly 105 to be rotated in place within the housing 102. Once a desirable clocking of the inner housing assembly 105 is achieved, the user rotates the one or more drive screws or fasteners 116 to prevent not only removal or lifting of the inner housing assembly 105 from out of the housing 102, but to also prevent further rotation of the inner housing assembly 105 relative to the housing 102. For example, in certain embodiments of the in-grade light 100 disclosed herein, the in-grade light 100 can be secured flush with a roadway while also preventing the in-grade light 100 from rotating when a vehicle tire is turned while in contact with the in-grade light.

In certain embodiments, as the one or more drive screws or fasteners 116 is tightened, the one or more receptacles or nuts 118 raises the collar 112 causing the one or more teeth 114 of the collar 112 to move in an upward direction towards the ledge 123 of the housing 102. The amount of contact increases until an interference fit or pressure between the collar 112 and the ledge 123 of the housing 102 essentially locks or fixes the position of the inner housing assembly 105 within the housing 102.

In certain embodiments, the collar 112 includes one or more contact surfaces which form the interference fit with the ledge 123. In certain embodiments, the one or more contact surfaces are made of a material that provides an adequate level of friction or grip with the ledge 123 of the housing 102. In certain embodiments, the one or more contact surfaces have a surface roughness selected to enhance the interference fit or grip with the ledge 123 of the housing 102. In certain embodiments, the one or more contact surfaces are the one or more teeth 114.

In certain embodiments, loosening of the one or more drive screws or fasteners 116 allows the one or more teeth 114 of the collar 112 to retract away from the ledge 123 as the one or more receptacles or nuts 118 moves in a downward direction along the shaft of the one or more drive screws or fasteners 116. Once sufficiently loosened, the interference fit is removed or lowered so as to allow the inner housing assembly 105 to be rotated relative to the housing 102. The inner housing assembly 105 may then be rotated within the housing 102 for adjustment of the angle of the light beam without lifting the inner housing assembly 105 out of the housing 102.

Once the one or more drive screws or fasteners 116 are disengaged from the one or more receptacles or nuts 118, the inner housing assembly 105 can be lifted out of the housing 102 for replacement or service. In some embodiments, one or more electrical connections (e.g., plugs or other connections) between the inner housing assembly 105 and some other portion of the in-grade light 100 can be disconnected to completely remove the inner housing assembly 105 from the in-grade light 100.

Of course the one or more receptacles or nuts 118 and the collar 112 could either move in the upward or downward directions and still fall within the scope of this disclosure. In some cases, all or a portion of the inner housing assembly 105 can be disassembled while positioned in the housing 102.

A lens 132 can be installed on the body 106 to seal an interior of the inner housing assembly 105. For example, the lens 132 can be installed on the inner housing assembly 105 using the one or more drive screws or fasteners 116.

For expository purposes, the term "horizontal" as used herein is defined as a plane parallel to the plane or surface of the floor of the area in which the system being described is used or the method being described is performed, regardless of its orientation. The term "floor" floor can be interchanged with the term "ground." The term "vertical" refers to a direction perpendicular to the horizontal as just defined. Terms such as "above," "below," "bottom," "top," "side,"

"higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

The terms "approximately", "about", "generally" and "substantially" as used herein represent an amount close to the stated amount that still performs a desired function or achieves a desired result. For example, the terms "approximately", "about", "generally," and "substantially" may refer to an amount that is within less than 10% of the stated amount.

What is claimed is:

1. A housing for a light assembly comprising:

an outer housing having:

a first end configured to be positioned at or below a ground level or wall surface when installed;

a second end opposite the first end;

a sleeve portion between the first end and the second end, the sleeve portion having an inner surface;

a ledge; and an outer housing axis extending through the first and second ends of the outer housing; and a collar movable in a direction that is parallel to the outer housing axis between a locked configuration and an unlocked configuration, the collar having a slot and a contact surface, the slot being sized and shaped to receive a mating structure of a body of the light assembly at least when the light assembly is placed within the outer housing so as to prevent the light assembly from rotating relative to the collar, the contact surface being configured to contact the ledge when the collar is in the locked configuration so as to prevent both removal and rotation of the body relative to the outer housing, wherein the collar and the light assembly are rotatable in concert with each other relative to the outer housing when the collar is in the unlocked configuration and the mating structure is received within the slot.

2. The housing of claim 1, wherein the collar comprises one or more teeth, and wherein the contact surface is disposed on the one or more teeth.

3. The housing of claim 2, wherein an interference fit is created between the one or more teeth and the ledge at least when the collar is in the locked configuration.

4. The housing of claim 1, wherein the ledge extends about at least a portion of the inner surface of the sleeve portion.

5. The housing of claim 1, wherein the inner surface of the sleeve portion further comprises a member, and wherein the member and the ledge define a channel, and wherein the collar is disposed in the channel.

6. The housing of claim 5, wherein the channel comprises a plurality of sections.

7. The housing of claim 5, wherein the collar contacts the member when the collar is in the unlocked configuration.

8. The housing of claim 1, wherein the collar has an annular shape.

9. The housing of claim 1, wherein the direction that the collar moves when the collar is moving from the unlocked configuration to the locked configuration is an upward direction.

10. The housing of claim 1, further comprising one or more drive screws configured to cause the collar to move from the unlocked configuration to the locked configuration.

11. The housing of claim 10, wherein the collar further comprises one or more nuts configured to be engaged by the one or more drive screws at least when the collar is in the locked configuration.

12. The housing of claim 10, wherein the collar is configured to move toward and away from the first end of the outer housing in response to user input to the one or more drive screws.

13. The housing of claim 1, further comprising the light assembly.

14. The housing of claim 13, further comprising a cover configured to be secured to the body of the light assembly.

15. The housing of claim 13, wherein the light assembly is configured to receive a light module, the light module being configured to emit light through the first end of the outer housing when the light assembly is installed within the outer housing.

16. The housing of claim 13, further comprising a lens assembly connected to the body of the light assembly.

17. An in-grade light assembly comprising:

an outer housing configured to be positioned at or below a ground level or wall surface when installed, the outer housing comprising a ledge;

an inner housing assembly configured to be placed within the outer housing; and a collar disposed in the outer housing and having a contact surface, the collar being configured to rotate about an axis and slide parallel to the axis relative to the outer housing when in an unlocked configuration, wherein the contact surface contacts the ledge when the collar is in a locked configuration so as to prevent both removal and rotation of the inner housing assembly and the collar relative to the outer housing.

18. The in-grade light assembly of claim 17, wherein the collar has an annular shape.

19. The in-grade light assembly of claim 17, wherein the outer housing comprises a channel, and wherein the collar is disposed in the channel.

20. The in-grade light assembly of claim 17, wherein the collar comprises a slot configured to receive a mating structure of the inner housing assembly at least when the collar is in the unlocked configuration.

21. The in-grade light assembly of claim 20, wherein the inner housing assembly is prevented from rotating relative to the collar when the mating structure is received within the slot.

22. The in-grade light assembly of claim 17, wherein the collar comprises a nut, the nut being configured to receive a drive screw at least when the collar is in the locked configuration.

23. The in-grade light assembly of claim 22, wherein the drive screw is tight to the nut when the collar is in the locked configuration.

24. The in-grade light assembly of claim 17, wherein the inner housing assembly comprises a support and/or a ring configured to provide additional stiffness, rigidity, and/or strength to the in-grade light assembly.

* * * * *